July 30, 1963  R. I. SARBACHER  3,099,834
SYSTEM FOR AIRFIELD GROUND TRAFFIC CONTROL
Filed Oct. 16, 1956  2 Sheets-Sheet 1
FIG. 1
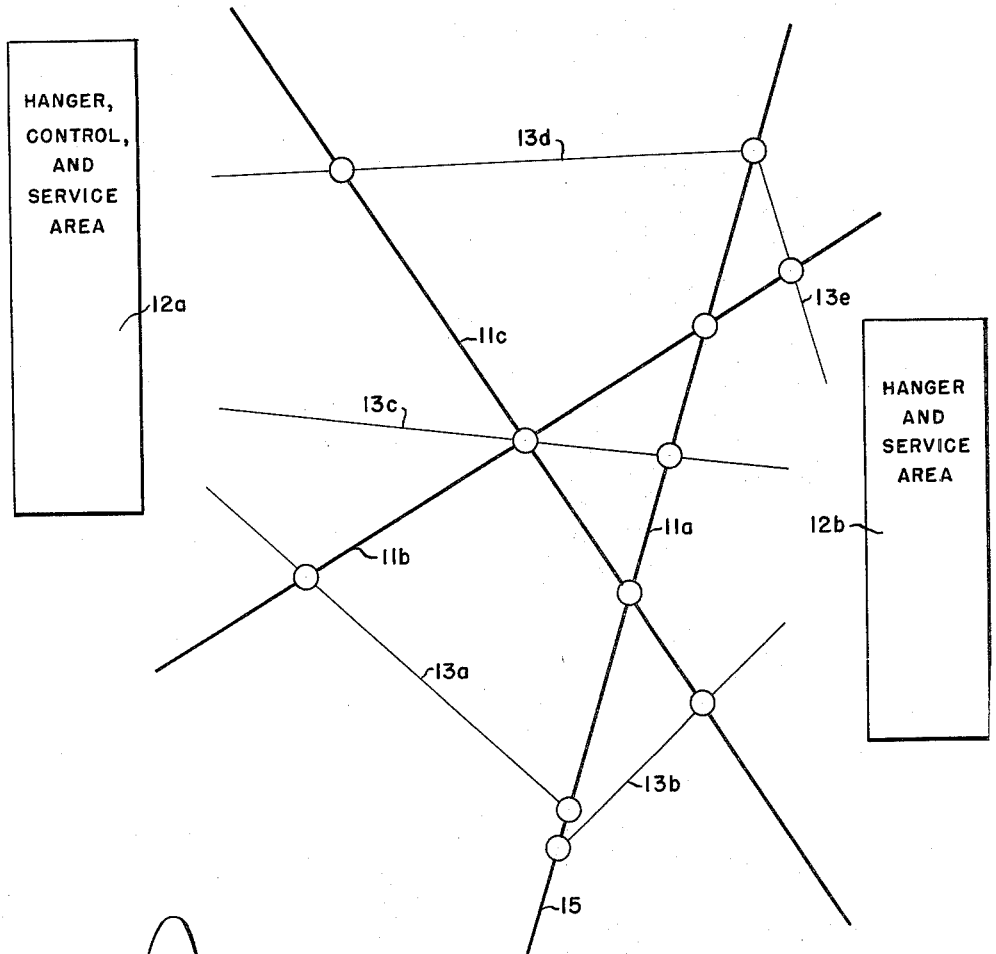
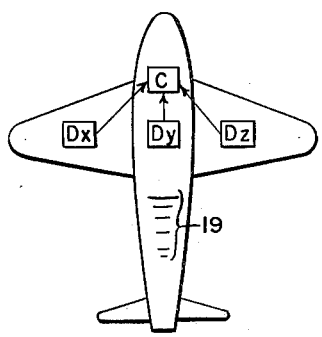
FIG. 4
INVENTOR
ROBERT I. SARBACHER
BY *Paris and Haskell*
ATTORNEYS

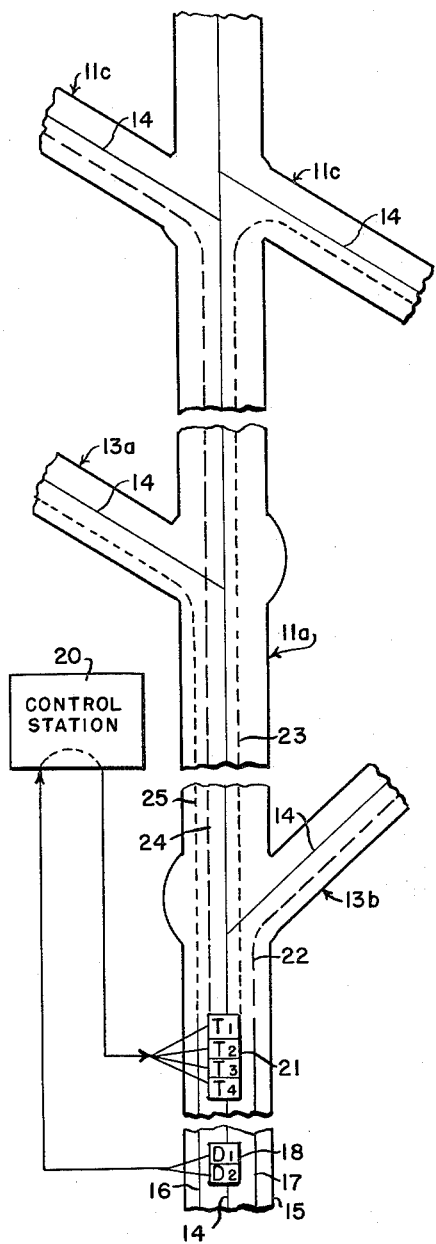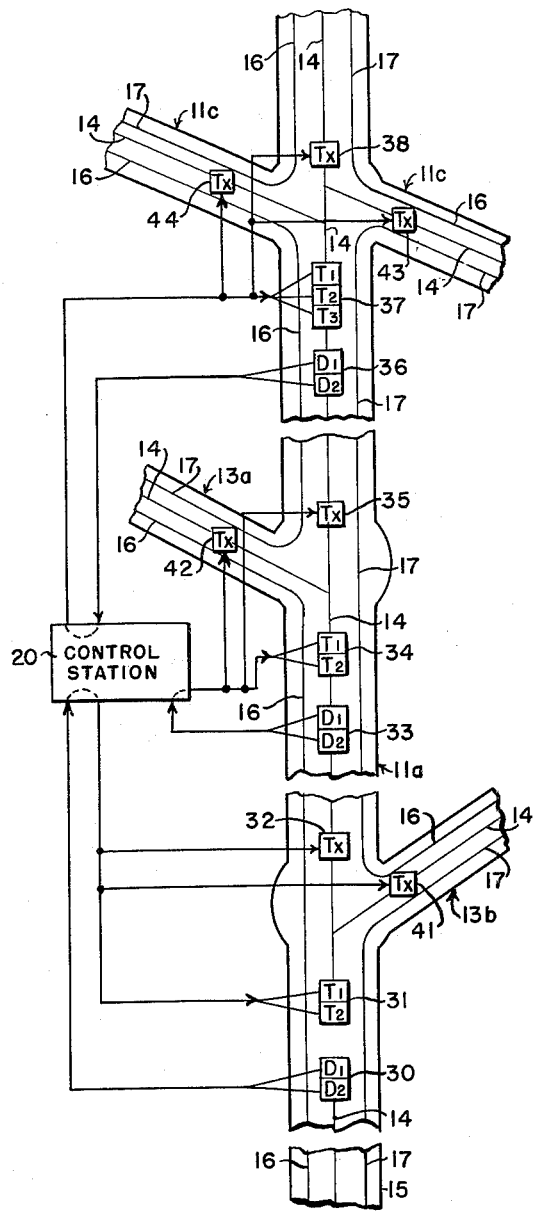

United States Patent Office 3,099,834
Patented July 30, 1963

3,099,834
SYSTEM FOR AIRFIELD GROUND TRAFFIC CONTROL
Robert I. Sarbacher, 2424 Massachusetts Ave., Washington, D.C.
Filed Oct. 16, 1956, Ser. No. 616,254
19 Claims. (Cl. 343—101)

The present invention relates generally to airfield traffic control, and more particularly to the control, guidance, direction, and disposition of aircraft on the ground of an airfield.

An airfield usually comprises a plurality of main runways for aircraft landing and take-off, together with a number of taxiways for facilitating the movement of aircraft on the ground between various localities of the airfield, such as to and from appropriate runways, and from one runway to another. From the standpoint of commercial airfield operation, particularly during peacetime, the problems of ground traffic control are not of too much concern, because of the relative lack of urgency in getting large numbers of craft on and off a field in minimum time. Also, the lighting and light marking of runways and taxiways enable the pilot to direct the plane readily at night in accordance with a preexisting pattern, or as directed by radio link with the airfield central control station. In the case of military airfields, however, particularly in time of war, the situation is quite different. Here it is urgent to be able to get large numbers of aircraft into the air or onto the ground in minimum time. It is also imperative that the airfield be operational even during black out conditions, and that a minimum of conventional radio communication be required for field operation, so that aircraft can land and take off with a minimum possibility of enemy bombers being able to locate the airfield.

In general, the present invention attains the foregoing desiderata by the use of trace radioactive markers and transmitters on the runways and taxiways of an airfield, combined with radiation detectors on the aircraft for sensing and interpreting the field radioactive markers; together with radioactive markers on the aircraft, combined with suitable detectors on the field for sensing the aircraft. Some of the airfield radioactive radiators may, in the broad sense, be capable of modulation, and the radioactive markings on the craft may be individually coded. By this expedient, it is contemplated that, in essence, a form of two way communication by radioactivity may be established between the craft on the field and a central control station. Thus, incoming and outgoing flights may be rapidly monitored and guided, automatically if desired, to disperse properly and efficiently a rapid succession of incoming flights off the runway, and similarly to direct in orderly fashion the rapid take-off of a large number of craft.

Since, in accordance with the teachings of the present invention, the entire problem of airfield ground control and direction, and runway marking, may all be effected by trace radioactive energy communication and marking, the airfield may be completely blacked out, and no conventional radio communication need be employed for ground operation, thus minimizing the possibility of enemy detection. Although the foregoing advantages appear of most importance for military operations, the present invention offers further advantages of value also to commercial airfield operation. The present system lends itself to automatic direction and guidance of aircraft along the ways of a field, for landing, take-off and general taxiing purposes; hence making available a more efficient, more rapid, and safer airfield ground operation.

It is accordingly one object of the present invention to provide a system of ground traffic control for airfields.

Another object of the present invention is to provide an airfield ground traffic control system utilizing the energy of radioactive materials or devices as a communications means in the process of directing and/or guiding the course of aircraft on the field.

Another object of the present invention is to provide an airfield ground traffic control system utilizing the energy of radioactivity for directing an aircraft along the ways of an airfield, and for communicating to an intelligence center the progress and position of aircraft on the ways.

Other objects and advantages of the present invention will become apparent to those skilled in the art from a consideration of the following detailed description of two exemplary specific embodiments thereof, had in conjunction with the accompanying drawings wherein:

FIG. 1 is a diagrammatic representation of several runways and taxiways of an airfield;

FIG. 2 is an enlarged fragmentary view of a portion of one runway from FIG. 1, showing the application of one embodiment of the present invention thereto;

FIG. 3 is a similar view of the same portion of the runway as shown in FIG. 2, but illustrating the application of a second embodiment of the present invention thereto; and FIG. 4 is a diagrammatic illustration of an aircraft, from the underside, adapted to function in combination with the provisions had in the runway of FIGS. 2 and 3.

Referring to FIG. 1 of the drawings, an airfield usually comprises a plurality of main runways, as denoted by the numerals 11a, 11b, and 11c. Disposed at various areas about the periphery of the runway pattern are hanger, service, administration, and field control facilities generally denoted by the numerals 12a and 12b. As is apparent, aircraft landing on a runway must be able to taxi to the appropriate peripheral facilities of the field, and similarly, aircraft must be able to taxi from the peripheral facilities to an appropriate runway for take-off. To expedite and facilitate such ground movements, a pattern of taxiways may be designated on the field, as indicated by the numerals 13a, 13b, 13c, 13d, and 13e. The present invention is concerned with the control, direction, guidance and disposition of aircraft over the pattern of runways and taxiways of an airfield, so as to get a landed craft or series thereof expeditiously off the runway in use and properly dispersed to the periphery of the field, and similarly get aircraft from the periphery of the field to an appropriate runway for take-off and into the air. Also, the present invention contemplates the guidance and direction of craft from one section of the field to another, aside from landing and taking-off procedures.

As illustrative of one embodiment of the present invention, in FIG. 2, there is shown a portion of runway 11a, together with fragments of the runways and taxiways branching therefrom—13b, 13a, and two portions of 11c. Applied along the center of this runway, essentially for the length thereof, is a stripe of trace radioactive paint or the like 14. The term "paint" as used herein and in the appended claims is intended to embrace not only a surface coating, but also absorbed impregnants, an imbedded layer, and generally any functionally equivalent means or device. For the purpose of illustration, the drawing is designed to exemplify the present system when an aircraft is landing on runway 11a and approaching from the end 15 thereof. At end 15, in addition to the center stripe 14, there are two side stripes 16 and 17 running parallel with the center stripe for a desired length of runway.

An aircraft designed to cooperate with the present system carries, as shown in FIG. 4, downwardly directive radiation detectors of any appropriate type—Dx to starboard, Dz to port, and Dy in the center. A computer or control center on the craft is designated by C, and the information sensed by the detectors is fed thereto. Although computer C may also include an autopilot for directing the craft in accordance with the information sensed by the detectors, the entire function of the computer may be reduced to a mere comparator to provide directional information to the pilot. Even further simplifying the airborne equipment, if desired, the outputs of the detector may be separately indicated, and the pilot may himself also perform the comparator functions.

Thus, as the craft travels over lines 14, 16, and 17, the detectors Dy, Dz, and Dx respectively pick up the radiation predominantly from the separate lines. Since the detectors Dx, Dy and Dz are made directive, the comparative intensity of reception at said detectors is a function of the transverse position of the craft on the runway 11a. Thus, by comparison of the intensity of reception at the three detectors, the computer and autopilot C can center the craft on the runway, or the pilot can perform the computer and autopilot functions on the basis of said radiation reception. Of course, if the action is performed by an autopilot, the degree of response of off-center signals should be correlated with the speed of the craft.

With the craft now landed, centered on, and proceeding down the runway, it passes over a set of detectors D1 and D2, indicated as a unit 18, embedded in the runway 11a. As indicated in FIG. 4, a pattern of radioactive paint or the like 19 is applied to the underside of the craft. Each craft attached to the airfield may be provided with a distinctive code pattern of markings 19. This pattern is detected at 18 to identify the particular craft to the control station 20. At the same time, by the use of two spaced detectors at 18, the speed of the craft can be computed at the control station. Knowing the identity of the craft and its speed, the control station can now determine the entire taxiing path appropriate for dispersing this craft off the runway 11a and to the periphery of the airfield. This determination can be done automatically by a computer installation at the control station, or by operator judgment. In either event, the control station activates selected radioactive radiation transmitters T1, T2, T3, and T4 of bank 21, embedded in the runway. The pattern of activation of transmitters 21 represents a code denoting for example four possible ultimate paths for the craft to follow. As the craft passes over transmitters 21, detector Dy senses the code, and the computer is thereby set to follow one of the four paths in the manner to be indicated.

Following transmitters 21, the runway carries four discrete patterns of radioactive paint 22, 23, 24, and 25, two to the right of center line 14, and two to the left. Right and left side of the center line is itself one distinguishing feature. Of the two paths to right of center, these are distinguished from each other by being applied in mutually distinguishable code patterns. For example, line 22 may be a pattern of regularly recurring long dashes, whereas line 23 may be a pattern of regularly recurring dots or short dashes. As the starboard detector Dx picks up these two patterns, the computer C is keyed as a result of transmitters 21 to respond to only one or the other. This same distinction may be employed as between lines 24 and 25.

Following transmitters 21, the computer is keyed to respond to and center the craft on the basis only of the center line 14 as followed by detector Dy, and either the lines 22 and 23 to the right of center as followed by detector Dx, or the lines 24 and 25 to the left of center as followed by detector Dz. The right or left selection may be effected by deactivating detector Dx or detector Dz. In addition, whichever of the side detectors Dx or Dz is used, the computer responds only to one of the two coded lines detected. Thus, if at 21 the craft is instructed to center its detectors Dy and Dx on lines 14 and 22, it proceeds along the runway 11a until it reaches taxiway 13b, whereupon it is compelled to turn right into said taxiway and follow therealong in order to maintain balance between the center line and line 22. Similarly, the craft can be instructed at 21 to center on the basis of the center line and line 23, or line 24, or line 25. Line 23 would cause the craft to exit right onto runway 11c, line 24 would cause it to exit left at runway 11c, and line 25 would cause it to exit left at taxiway 13a.

The foregoing pattern and direction of paths is presented only as exemplary of the invention. It is apparent that the system can be expanded by appropriate runway and taxiway markings, and by the provision of additional detectors 18 and transmitters 21 at various points on the airfield, to direct and control the ground traffic on all the runways and taxiways for take-off or landing, or merely for taxiing craft from one locality to another on the airfield. Also, if desired, the detectors 18 and transmitters 21 can be placed alongside the runways. In which case, the craft coded markings 19 would be placed on the sides of the craft, and special detectors on the sides of the craft would be provided for receiving the added intelligence from such transmitters 21. Further, all functions suggested above to be performed by craft computer C can be performed by the pilot, by reducing the would-be computer input intelligence to appropriate audible or visual presentation in the craft; or these functions can of course be performed by a combination of pilot and computer.

In the embodiment shown in FIG. 3, rather than relying on a fixed plan of exit for a craft, there is here provided a system where the progress of the craft is periodically checked by the control station, and any change in the craft's course need not be determined until an appropriate runway intersection is reached. In certain respects, therefore, this latter system is more flexible than that provided in FIG. 2. However, it is understood that with respect to the embodiment of FIG. 2, additional transmitters 21 positioned at critical points on the airfield could switch the previously established course of the craft from one line to another.

FIG. 3 illustrates the same portion of runway 11a and intersecting ways shown in FIG. 2, and for the purpose of illustration, the invention is again here described with reference to guiding a landing aircraft approaching from end 15 on runway 11a. Runway 11a and its intersecting ways are again provided with a trace radioactive center line 14, and a similar right side line 17 and left side line 16. Instead of providing coded side lines as in FIG. 2, however, the same continuous side lines are extended along the entire pattern of ways, as shown.

Thus, an aircraft approaching from and landing on portion 15 of runway 11a is first centered by lines 14, 16, and 17 through the medium of detectors Dx, Dy, and Dz, with, if desired, the aid of computer C and an autopilot. When the craft is centered, it passes detectors D1 and D2 of bank 30 where the identity 19 of the craft is read and its speed checked. This information is assembled at control station 20. If it is determined that it is appropriate for this craft to turn off onto taxiway 13b, the bank of transmitters T1 and T2 at 31 are appropriately energized to advise the craft computer in coded intelligence received by detector Dy to center the craft on the basis of lines 14 and 17 only. Detector Dz on the craft may, for example, be turned off, or its output switched out of the computer. The craft is thereby compelled to exit right onto taxiway 13b following lines 14 and 17. When the craft enters taxiway 13b, it passes another radioactive transmitter at 41 designated as Tx, which is appropriately coded to advise the craft computer to switch back and again center on the basis of all three lines 14, 16, and 17, using detectors Dx, Dy, and Dz. However, when the craft passes the detectors 30, if it is determined at the control station that taxiway 13b is not appropriate for this craft and its speed, the transmitters at 31 are keyed to advise the craft computer to center on the basis of lines 14 and 16. The craft then continues on runway 11a, and passes the transmitter Tx at 32 to be switched back to centering on the basis of lines 14, 16, and 17. As the craft now proceeds down runway 11a, it passes another bank of detectors D1 and D2 at 33 and transmitters T1 and T2 at 34, which act in the same manner as those at 30 and 31 to direct the craft either left onto taxiway 13a or straight along runway 11a. When the craft passes the intersection, either turning or going straight, it passes a transmitter Tx at 35 or 42, to reestablish guidance on the three trace radioactive lines 14, 16, and 17.

At the intersection of runways 11a and 11c, there are three possibilities: the craft may either turn left, right, or go straight. In approaching this intersection, the craft is again detected by D1 and D2 at 36, and then passes a three transmitter bank T1, T2, and T3 at 37. The greater number of transmitters is required to account for the three choices in direction. If the craft is instructed to turn left, it will center on the basis of lines 14 and 16. If it is required to go right, it will center on the basis of lines 14 and 17. However, if the craft is instructed to go straight, it will follow no pair of lines, but may rely on a stabilized course for passing through this intersection and continuing on a straight course. After clearing this intersection, whether by going straight, left, or right, the craft passes a transmitter Tx at 38, 44, or 43 to reestablish guidance on the basis of three lines.

As in the case of the embodiment of FIG. 2, it should be understood that the description of the invention relative to FIG. 3 is not intended to embrace the full scope of application of the system. Additional detectors D1 and D2 and additional transmitters T1, T2, T3 may be provided at any desired and necessary points on the airfield for extending the application of the system to all functions of airfield ground operation control and guidance. The illustration of the invention as applied to directing a landing aircraft is merely exemplary of the system operation, and the extension thereof to the other airfield ground functions and to both directions of travel on the ways will be apparent to those skilled in the art.

It should be understood that line 14 in both embodiments has been referred to as a center line for convenience. It would in practice be more advantageous if this line were offset from center somewhat. The reason therefor resides in the fact that guidance cannot be practically accomplished if the craft detectors Dx, Dy, and Dz relied on for guidance are located directly over the guiding lines, because it would then be unknown if a deviation is to the left or right. Any two lines relied on at any time for guidance should be oriented relative to the two aircraft detectors following them to provide a differential action in their outputs in response to position error of the craft, in order that the direction of error can be ascertained; i.e. if error to the left causes a decrease in reception at the left detector, it should cause an increase in reception at the right detector, and vice versa. Of course, the same result may be held by the functional equivalent of placing the detectors directly over the lines, but designing them for directive reception in directions that afford the same results.

The foregoing detailed description is presented to facilitate an understanding of the radioactive ground guidance, control, and communication system embraced by the present invention, and modifications and variations thereof will be apparent to those skilled in the art. For example, additional intelligence could be communicated between control station 20 and the craft by the provision of other coded or modulated transmitters or radiators along the ways, or by additional modulation of present transmitters. Such additional information may, for instance, relate to speed control of the craft. Accordingly such modifications and changes as are embraced by the spirit and scope of the appended claims are contemplated as within the purview of the present invention.

I claim:

1. A system for airfield ground traffic control comprising a plurality of radioactive markers along runways of the airfield for guiding aircraft therealong, radioactivity detecting means positioned along said runways for sensing the movement of aircraft, having radioactivity radiators, over said runways, transmitting means for directing said aircraft to desired runways, and means for receiving information from said detecting means and transmitting information to said transmitting means, thereby to provide for traffic control of aircraft.

2. A system as defined in claim 1, wherein said transmitting means is a modulatable radioactivity transmitting means positioned along said runways.

3. A system as defined in claim 2, wherein said markers are radioactive lines along said runways.

4. A system as defined in claim 1, wherein said markers are radioactive lines along said runways.

5. A system for airfield ground traffic control comprising a plurality of radioactive lines along runways of the airfield for guiding aircraft therealong, said lines having different patterns providing identifying codes and following different courses over said runways, radioactivity detecting means positioned along said runways for sensing the movement of aircraft, having radioactivity radiators, over said runways, transmitting means for directing said aircraft to follow a selected one of said lines, and means for receiving information from said detecting means and transmitting information to said transmitting means, thereby to provide for traffic control of aircraft.

6. A system as defined in claim 5, wherein said transmitting means is a modulatable radioactivity transmitting means positioned along said runways.

7. A system for airfield ground traffic control comprising sets of three radioactive lines marking the runways of the airfield for guiding aircraft therealong, one being a center line and the other two being on opposite sides of said center line, the side lines joining and continuing with respectively adjacent side lines of intersecting runways at the intersections thereof, radioactivity detecting means positioned adjacent each said intersection for sensing the movement of aircraft, having radioactivity radiators, thereby, transmitting means for directing said aircraft to follow a selected one of said three lines, and means for receiving information from said detecting means and transmitting information to said transmitting means, thereby to provide for traffic control of aircraft.

8. A system as defined in claim 7, wherein said transmitting means is a modulatable radioactivity transmitting means positioned adjacent each said intersection.

9. A system for airfield ground traffic control of aircraft comprising a plurality of radioactive markers along runways of the airfield for guiding aircraft therealong, radioactivity detectors in the aircraft for enabling said craft to follow said lines, said craft also having coded radioactivity radiators thereon for identifying the craft, radioactivity detecting means positioned along said runways for sensing said radiators to locate and identify said aircraft on said airfield, transmitting means for directing said aircraft to desired runways, means on said craft for receiving and interpreting said transmitting means directions, and means for receiving information from said detecting means and transmitting information to said transmitting means, thereby to provide for traffic control of aircraft.

10. A system as defined in claim 9, wherein said transmitting means is a modulatable radioactivity transmitting means positioned along said runways, and said receiving means on said craft is a radioactivity detector.

11. In a system for airfield ground traffic control, radioactivity detecting means positioned along runways of the airfield for sensing the movement of aircraft, having radioactivity radiators, over said runways, means for transmitting the information sensed by said detecting means to a control center, means at said control center for receiving and analyzing said information, and means at said control center for enabling communication with said aircraft of the desired course direction information.

12. In an airfield having: a plurality of runways forming a pattern thereover for the ground movement of aircraft, a traffic control center, and means controlled by said control center for communicating with aircraft for directing the aircraft on a desired course over said runways; the improvement comprising a plurality of radioactivity detecting means spaced along said runways for sensing the movement of aircraft, having radioactivity radiators, over said runways, means for transmitting information sensed by said detectors to said control center, and means at said control center for analyzing said information sensed by said detectors, thereby enabling the location of the aircraft to be determined and intelligence to be communicated to the aircraft for traffic control thereof.

13. In an airfield having: a plurality of runways forming a pattern thereover for the ground movement of aircraft, a traffic control center, and means controlled at said control center for communicating with aircraft for directing the aircraft on a desired course over said runways; the improvement comprising, in combination, coded radioactivity radiators on said aircraft, a plurality of radioactive detecting means spaced along said runways adapted to pick up radiations from said radiators and thereby sense the identity and movement of aircraft over said runways, means for transmitting information sensed by said detectors to said control center, and means at said control center for analyzing said information sensed by said detectors, thereby enabling the location of the aircraft to be determined and intelligence to be communicated to the aircraft for traffic control.

14. A system for airfield ground traffic control as defined in claim 11, wherein said means at said control center for enabling communication to said aircraft of the desired course direction information, comprises radiant energy transmitting means.

15. In an airfield as defined in claim 12, said means controlled at said control center for communicating with aircraft for directing the aircraft on a desired course over said runways, comprising radiant energy communicating means.

16. In an airfield as defined in claim 13, said means controlled at said control center for communicating with aircraft for directing the aircraft on a desired course over said runways, comprising radiant energy communicating means.

17. A system for traffic control of vehicles over a predetermined pattern of pathways comprising, in combination, radioactivity detecting means carried by each vehicle to be controlled, a plurality of radioactivity radiating course marker means defining the various pathways in said pattern, the radiation from the course marker means defining different courses over said pattern of pathways being distinguishably coded by a radiation characteristic which can be sensed by said detecting means, whereby said vehicle can be directed over a selected course on said pattern of pathways by following a selected course marker code.

18. A system as set forth in claim 17 and further including individually coded radioactivity radiators on said vehicles, radioactivity detectors positioned on said pathways, and means for communicating information sensed by the last-mentioned detectors to an information center, whereby the location and course of the vehicles on the pathways may be determined at said center.

19. A system as set forth in claim 18 and further including means for communicating from said center to said vehicles, whereby the course followed by said vehicles may be directed and selected as said vehicles proceed over said pathways.

References Cited in the file of this patent

UNITED STATES PATENTS

| | | |
|---|---|---|
| 1,960,439 | Hahnemann | May 29, 1934 |
| 1,981,206 | Strauss | Nov. 20, 1934 |
| 2,178,237 | Linder | Oct. 31, 1939 |
| 2,204,628 | Sorensen | June 18, 1940 |
| 2,216,707 | George | Oct. 1, 1940 |
| 2,317,400 | Paulus | Apr. 27, 1943 |
| 2,339,291 | Paulus | Jan. 18, 1944 |
| 2,365,949 | Green | Dec. 26, 1944 |
| 2,378,242 | O'Neil | June 12, 1945 |
| 2,656,470 | Herzot | Oct. 20, 1953 |
| 2,750,583 | McCullough | June 12, 1956 |
| 2,992,330 | Cooper et al. | July 11, 1961 |